(12) United States Patent
Spack et al.

(10) Patent No.: US 10,099,796 B2
(45) Date of Patent: Oct. 16, 2018

(54) SYSTEM AND METHOD FOR DYNAMICALLY CONTROLLING THE OPERATION OF AN AIRCRAFT

(71) Applicant: General Electric Company, Schenectady, NY (US)

(72) Inventors: Jeffrey Michael Spack, Peabody, MA (US); Albion R. Fletcher, Jr., Braintree, MA (US); Drew G. Rindner, Boston, MA (US)

(73) Assignee: General Electric Company, Schenectady, NY (US)

( * ) Notice: Subject to any disclaimer, the term of this patent is extended or adjusted under 35 U.S.C. 154(b) by 78 days.

(21) Appl. No.: 15/284,827

(22) Filed: Oct. 4, 2016

(65) Prior Publication Data
US 2018/0093778 A1    Apr. 5, 2018

(51) Int. Cl.
| | |
|---|---|
| *B64D 31/06* | (2006.01) |
| *B64D 27/14* | (2006.01) |
| *F01D 21/00* | (2006.01) |
| *F02C 6/02* | (2006.01) |
| *F02C 6/20* | (2006.01) |
| *F02C 7/042* | (2006.01) |
| *F02C 7/057* | (2006.01) |

(52) U.S. Cl.
CPC ............. *B64D 31/06* (2013.01); *B64D 27/14* (2013.01); *F01D 21/003* (2013.01); *F02C 6/02* (2013.01); *F02C 6/20* (2013.01); *F02C 7/042* (2013.01); *F02C 7/057* (2013.01); *F05D 2220/323* (2013.01); *F05D 2260/84* (2013.01)

(58) Field of Classification Search
CPC ....... B64D 31/06; B64D 27/14; F01D 21/003; F02C 6/02; F02C 6/20; F02C 7/042
See application file for complete search history.

(56) References Cited

U.S. PATENT DOCUMENTS

| | | |
|---|---|---|
| 5,551,402 A | 9/1996 | Liljenfeldt et al. |
| 5,601,063 A | 2/1997 | Ohashi et al. |
| 5,796,936 A | 8/1998 | Watabe et al. |

(Continued)

OTHER PUBLICATIONS

Schaffer, Distributed Control for Turbine Engine, ASME, vol. 121, Issue 1, Jan. 1, 1999, (online Nov. 19, 2007), pp. 102-107, http://gasturbinespower.asmedigitalcollection.asme.org/article.aspx?articleid=1420869.

*Primary Examiner* — Michael D Lang
(74) *Attorney, Agent, or Firm* — General Electric Company; Pamela Kachur (57) ABSTRACT

In one aspect, a method for dynamically controlling the operation of an aircraft having a first gas turbine engine and a second gas turbine engine may generally include receiving, by a first engine controller and a second engine controller, one or more operator commands deriving from an operator manipulated input device. The method may also include controlling the operation of the first gas turbine engine via the first engine controller, and the second gas turbine engine via the second engine controller. In addition, the method may include detecting a fault condition associated with the first engine controller, and subsequently switching control of the first gas turbine engine from the first engine controller to the second engine controller. The method may further include dynamically controlling the operation of the first gas turbine engine with the second engine controller.

16 Claims, 5 Drawing Sheets

(56) References Cited

U.S. PATENT DOCUMENTS

| | | |
|---|---|---|
| 6,196,499 B1 | 3/2001 | Kahler |
| 7,231,180 B2 | 6/2007 | Benson et al. |
| 7,733,037 B2 | 6/2010 | Marks et al. |
| 7,779,811 B1 | 8/2010 | Mailander et al. |
| 7,875,989 B2 | 1/2011 | Morris et al. |
| 7,966,804 B2 | 6/2011 | Snow |
| 8,036,805 B2 | 10/2011 | Mahoney et al. |
| 8,295,995 B2 | 10/2012 | Poisson |
| 8,327,117 B2 | 12/2012 | Smilg et al. |
| 9,080,517 B2 | 7/2015 | Guido et al. |
| 9,217,376 B2 | 12/2015 | Sweet et al. |
| 2002/0177978 A1 | 11/2002 | Obenhoff et al. |
| 2005/0049775 A1 | 3/2005 | Mooney |
| 2007/0164146 A1 | 7/2007 | Stephens |
| 2008/0010994 A1 | 1/2008 | Snow |
| 2010/0242492 A1 | 9/2010 | Sloat et al. |
| 2013/0255220 A1 | 10/2013 | Mathews, Jr. et al. |
| 2015/0291286 A1* | 10/2015 | Darby ............... F02C 9/00 701/100 |

\* cited by examiner

SYSTEM AND METHOD FOR DYNAMICALLY CONTROLLING THE OPERATION OF AN AIRCRAFT

FIELD OF THE INFORMATION

The present subject matter relates generally to a system and method for dynamically controlling the operation of an aircraft and, more particularly, to a system and method for dynamically controlling the operation of a first gas turbine engine of the aircraft with an automatic engine control system associated with a second gas turbine engine of the aircraft when it is detected that an automatic engine control system associated with the first gas turbine engine is no longer functioning properly.

BACKGROUND OF THE INVENTION

A gas turbine engine within an aircraft generally includes, in serial flow, a compressor section, a combustion section, a turbine section and an exhaust section. In operation, air enters an inlet of the compressor section where one or more compressors progressively compress the air until it reaches the combustion section. Fuel is mixed with the compressed air and burned within the combustion section to provide combustion gases. The combustion gases are then routed from the combustion section through a hot gas path defined within the turbine section and exhausted from the turbine section via the exhaust section.

Gas turbine engines for aircraft may employ automatic engine control systems, such as a Full Authority Digital Engine Control (FADEC) system. In particular, for aircraft having two or more gas turbine engines, a FADEC system is desirable, because the FADEC system dynamically controls the operation of each gas turbine engine and requires minimal, if any, supervision from the pilot. However, if the FADEC system fails for one or more gas turbine engines of the aircraft, automated dynamic control is lost for the affected gas turbine engine(s). In such instances, the pilot may use a manually operated backup system to manually control the operation of the affected gas turbine engine(s). However, these manually operated backup systems add both weight and cost and, for at least these reasons, are not typically included on modern aircraft. In addition, these manual back systems require substantial supervision from the pilot. This is undesirable, especially in combat situations involving enemy aircraft.

If the aircraft does not include a manually operated back up system, conventional systems often require either that the affected gas turbine engine(s) be shut down or that the operation of the affected gas turbine engine(s) be controlled according to a predetermined operating mode upon detection of the failure of the associated FADEC system(s). Thus, in contrast to the manually operated backup system, the pilot is not able to provide any inputs for controlling the operation of the affected gas turbine engine(s) once it has been shut down or, in the alternative, once the engine has been placed in its predetermined operating mode. This is particularly undesirable, because the pilot can no longer adjust the engine power of the affected gas turbine engine(s). As such, any change in the engine power requirements of the aircraft will be placed on the other remaining engine(s) to the extent possible and the overall range of power available to the aircraft will be diminished.

Accordingly, a system and method for allowing an operator to dynamically control a first gas turbine engine via an engine controller of a second gas turbine engine when the engine controller associated with the first gas turbine engine is not functioning would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for dynamically controlling the operation of an aircraft having a first gas turbine engine and a second gas turbine engine. The method may include receiving, by a first engine controller and a second engine controller, one or more operator commands deriving from one or more operator manipulated input devices. The method may also include controlling, by the first engine controller, an operation of the first gas turbine engine in response to, at least in part, the received operator command(s). In addition, the method may include controlling, by the second engine controller, an operation of the second gas turbine engine in response to, at least in part, the received operator command(s). The method may also include detecting a fault condition associated with the first engine controller. Further, the method may include switching control of the operation of the first gas turbine engine from the first engine controller to the second engine controller in response to detecting the fault condition. In addition, the method may include dynamically controlling, by the second engine controller, the operation of the first gas turbine engine in response to, at least in part, one or more new operator commands received subsequent to detecting the fault condition, the one or more new operator commands deriving from the one or more operator manipulated input devices.

In another aspect, the present subject matter is directed to a system for dynamically controlling the operation of an aircraft having a first gas turbine engine and a second gas turbine engine. The system may generally include a first engine controller and a second engine controller. The first engine controller may be configured to control an operation of the first gas turbine engine in response to, at least in part, one or more operator commands received from an operator of the aircraft. Likewise, the second engine controller may be configured to control an operation of the second gas turbine engine in response to, at least in part, the one or more operator commands received from the operator of the aircraft. In addition, the second engine controller may be configured to dynamically control the operation of the first gas turbine engine when a fault condition is detected for the first engine controller. Specifically, the second engine controller may be configured to dynamically control the operation of the first gas turbine engine in response to, at least in part, one or more new operator commands received from the operator subsequent to detecting the fault condition.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first" and "second" may be used interchangeably to distinguish one component from another and are not intended to signify location or importance of the individual components.

In general, the present subject matter is directed to a system and method for dynamically controlling the operation of an aircraft having two or more gas turbine engines. Specifically, in accordance with aspects of the present subject matter, the disclosed system and method allow for the operation of a first gas turbine engine of an aircraft to be dynamically controlled with an engine controller of a second gas turbine engine of the aircraft when it is determined that an engine controller of the first gas turbine engine is no longer functioning properly.

For example, in several embodiments, the disclosed system may include first and second engine controllers configured to receive one or more operator command(s) from an operator of the aircraft. The first engine controller may be configured to control the operation of the first gas turbine engine in response to, at least in part, the received operator command(s). Likewise, the second engine controller may be configured to control the operation of the second gas turbine engine in response to, at least in part, the received operator command(s). In addition, as will be described below, the second engine controller may be further configured to dynamically control the operation of the first gas turbine engine when a fault condition is detected for the first engine controller.

It should be appreciated the disclosed system provides for dynamic control of both of the first and second gas turbine engines using only one engine controller. More specifically, the system allows the operator to dynamically control the engine power level of the first gas turbine engine even while the first engine controller is inoperable due to a fault condition (e.g., due to a ballistic event). This provides greater maneuverability of the aircraft and, if desired, maintains consistent load sharing between the first and second gas turbine engines after a complete failure of one of the engine controllers.

Figure 1:
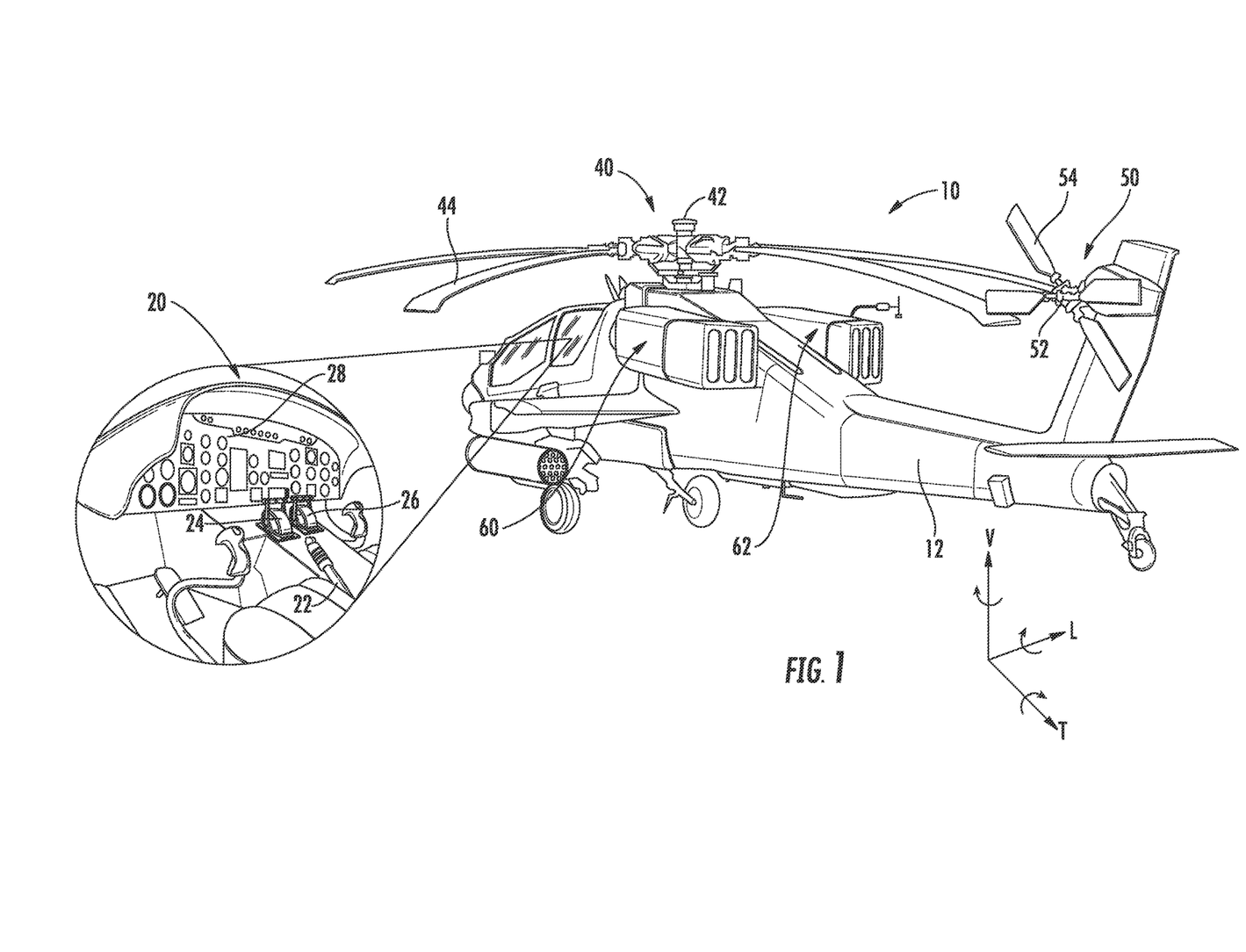
FIG. 1 is a perspective view of an aircraft in accordance with one embodiment of the present disclosure.

FIG. 1 provides a perspective view of an exemplary aircraft 10 in accordance with the present disclosure. The aircraft 10 defines an orthogonal coordinate system, including three orthogonal coordinate axes. More specifically, the three orthogonal coordinate axes include a lateral axis L, a longitudinal axis T, and a vertical axis V. In operation, the aircraft 10 may move along or around at least one of the lateral axis L, the longitudinal axis T, and the vertical axis V.

In the embodiment illustrated in FIG. 1, the aircraft 10 includes an airframe 12 defining a cockpit 20. The cockpit 20 includes a collective pitch input device 22, a first throttle input device 24, a second throttle input device 26, and an instrument panel 28. The aircraft 10 further includes a main rotor assembly 40 and a tail rotor assembly 50. The main rotor assembly 40 includes a main rotor hub 42 and a plurality of main rotor blades 44. As shown, each main rotor blade 44 extends outwardly from the main rotor hub 42. The tail rotor section 50 includes a tail rotor hub 52 and a plurality of tail rotor blades 54. Each tail rotor blade 54 extends outwardly from the tail rotor hub 52.

Additionally, the aircraft 10 includes a first gas turbine engine 60 and a second gas turbine engine 62. The first and second gas turbine engines 60, 62 generate and transmit power to drive rotation of the main rotor blades 44 and the tail rotor blades 54. In particular, rotation of the main rotor blades 44 generates lift for the aircraft 10, while rotation of the tail rotor blades 54 generates sideward thrust at the tail rotor section 50 and counteracts torque exerted on the airframe 12 by the main rotor blades 44.

The collective pitch input device 22 adjusts the pitch angle of the main rotor blades 44 collectively (i.e., all at the same time) to increase or decrease the amount of lift the aircraft 10 derives from the main rotor blades 44 at a given rotor speed. More specifically, manipulating the collective pitch input device 22 causes the aircraft 10 to move in one of two opposing directions along the vertical direction V. It should be appreciated that manipulating the collective pitch input device 22 can also be used to increase or decrease the amount of power the first and second gas turbine engines 60, 62 provide the main rotor assembly 40 to generate the desired lift of the aircraft 10.

The first throttle input device 24 controls a maximum engine power of the first gas turbine engine 60, and the second throttle input device 26 controls a maximum engine power of the second gas turbine engine 62. In the embodiment illustrated in FIG. 1, the first and second throttle input devices 24 and 26 are levers movable between a first position and a second position. Accordingly, moving the first and second throttle input devices 24, 26 to or towards the first direction increases the maximum engine power of the first and second gas turbine engines 60 and 62, respectively. In contrast, moving the first and second throttle input devices 24, 26 in the second direction decreases the maximum engine power of the first and second gas turbine engines 60 and 62, respectively. It should be appreciated, however, that the first and second throttle input devices 24 and 26 may be any suitable device configured to adjust the maximum engine power of the first and second gas turbine engines 60, 62. For example, the first and second throttle input devices 24, 26 may each be a switch having at least two discrete positions (e.g., OFF, IDLE, and FLY).

It should be appreciated that, although a particular aircraft has been illustrated and described, other configurations and/or aircraft, such as high speed compound rotary-wing aircraft with supplemental translational thrust systems, dual contra-rotating, coaxial rotor system aircraft, turboprops, tilt-rotors, tilt-wing aircraft, conventional take-off and landing aircraft and other turbine driven machines will also benefit from the present disclosure.

Figure 2:
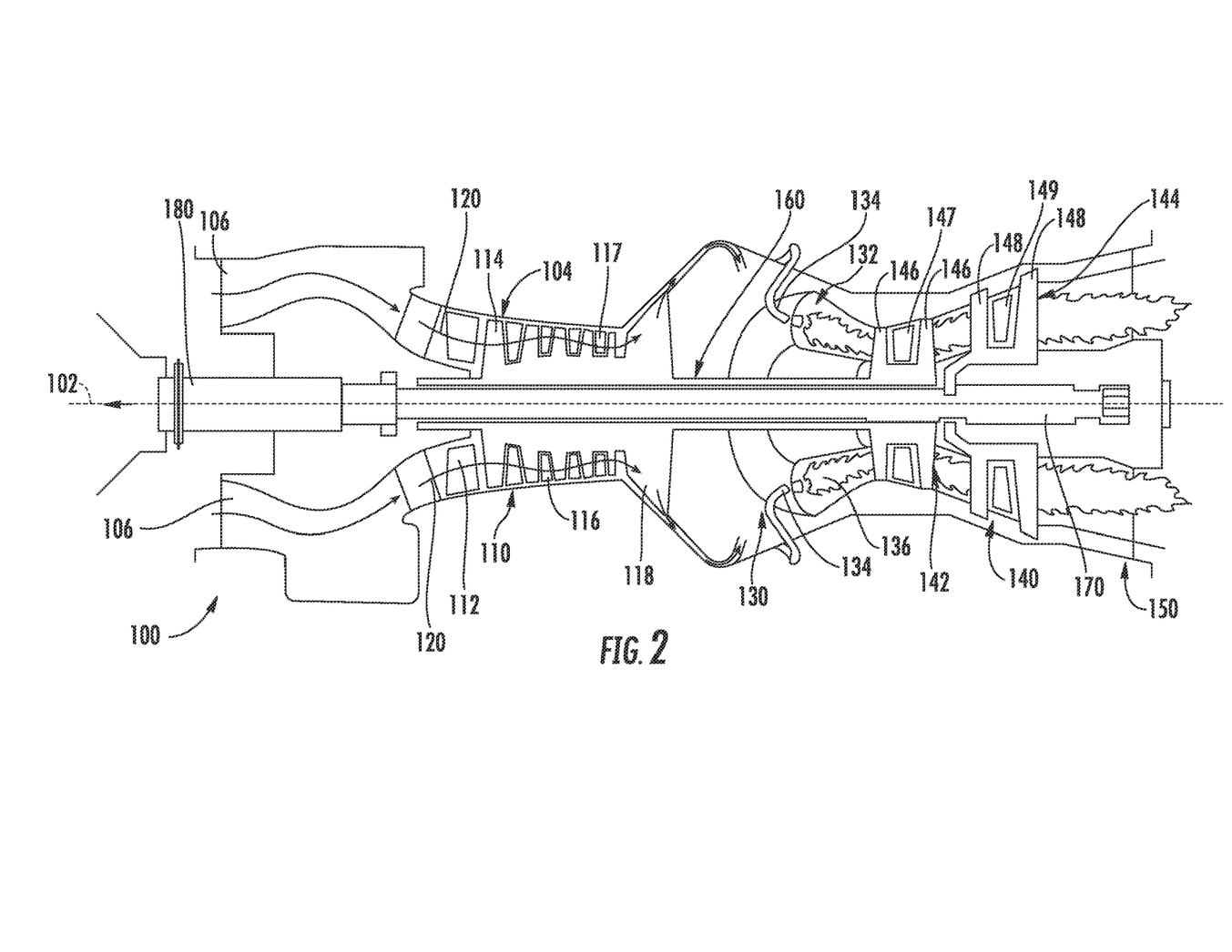
FIG. 2 is a schematic cross-sectional view of a gas turbine engine in accordance with one embodiment of the present disclosure.

FIG. 2 provides a schematic cross-sectional view of an exemplary gas turbine engine 100 in accordance with the present disclosure. As shown in FIG. 2, the gas turbine engine 100 defines a longitudinal or centerline axis 102 extending through for reference. The gas turbine engine 100 may generally include a substantially tubular outer casing 104 that defines an annular inlet 106. The outer casing 104 may be formed from a single casing or multiple casings. The outer casing 104 encloses, in serial flow relationship, a gas generator compressor 110, a combustion section 130, a turbine 140, and an exhaust section 150. The gas generator compressor 110 includes an annular array of inlet guide vanes 112, one or more sequential stages of compressor blades 114, one or more sequential stages of one or more stages of variable vanes 116, one or more sequential stages of one or more stationary compressor vanes 117, and a centrifugal compressor 118. Collectively, the compressor blades 114, variable vanes 116, stationary compressor vanes 117, and the centrifugal compressor 118 define a compressed air path 120.

The combustion section 130 includes a combustion chamber 132 and one or more fuel nozzles 134 extending into the combustion chamber 132. The fuel nozzles 134 supply fuel to mix with compressed air entering the combustion chamber 132. Further, the mixture of fuel and compressed air combust within the combustion chamber 132 to form combustion gases 136. As will be described below in more detail, the combustion gases 136 drive both the compressor 110 and the turbine 140.

The turbine 140 includes a gas generator turbine 142 and a power turbine 144. The gas generator turbine 142 includes one or more sequential stages of turbine rotor blades 146 and one or more sequential stages of stator vanes 147. Likewise, the power turbine 144 includes one or more sequential stages of turbine rotor blades 148 and one or more sequential stages of stator vanes 149. As will be discussed below in more detail, the gas generator turbine 142 drives the gas generator compressor 110 via a gas generator shaft 160, and the power turbine 144 drives an output shaft 180 via a power turbine shaft 170.

As shown in the embodiment illustrated in FIG. 2, the gas generator compressor 110 and the gas generator turbine 142 are coupled to one another via the gas generator shaft 160. In operation, the combustion gases 136 drive both the gas generator turbine 142 and the power turbine 144. As the gas generator turbine 142 rotates around the centerline axis 102, the gas generator compressor 110 and the gas generator shaft 160 both rotate around the centerline axis 102. Further, as the power turbine 144 rotates, the power turbine shaft 170 rotates and transfers rotational energy to the output shaft 180. As an example, the gas turbine engine 100 may be the first and second gas turbine engines 60, 62 of FIG. 1, and the output shaft 180 may rotate both the main and tail rotor blades 44, 54 of the aircraft 10.

Figure 3:
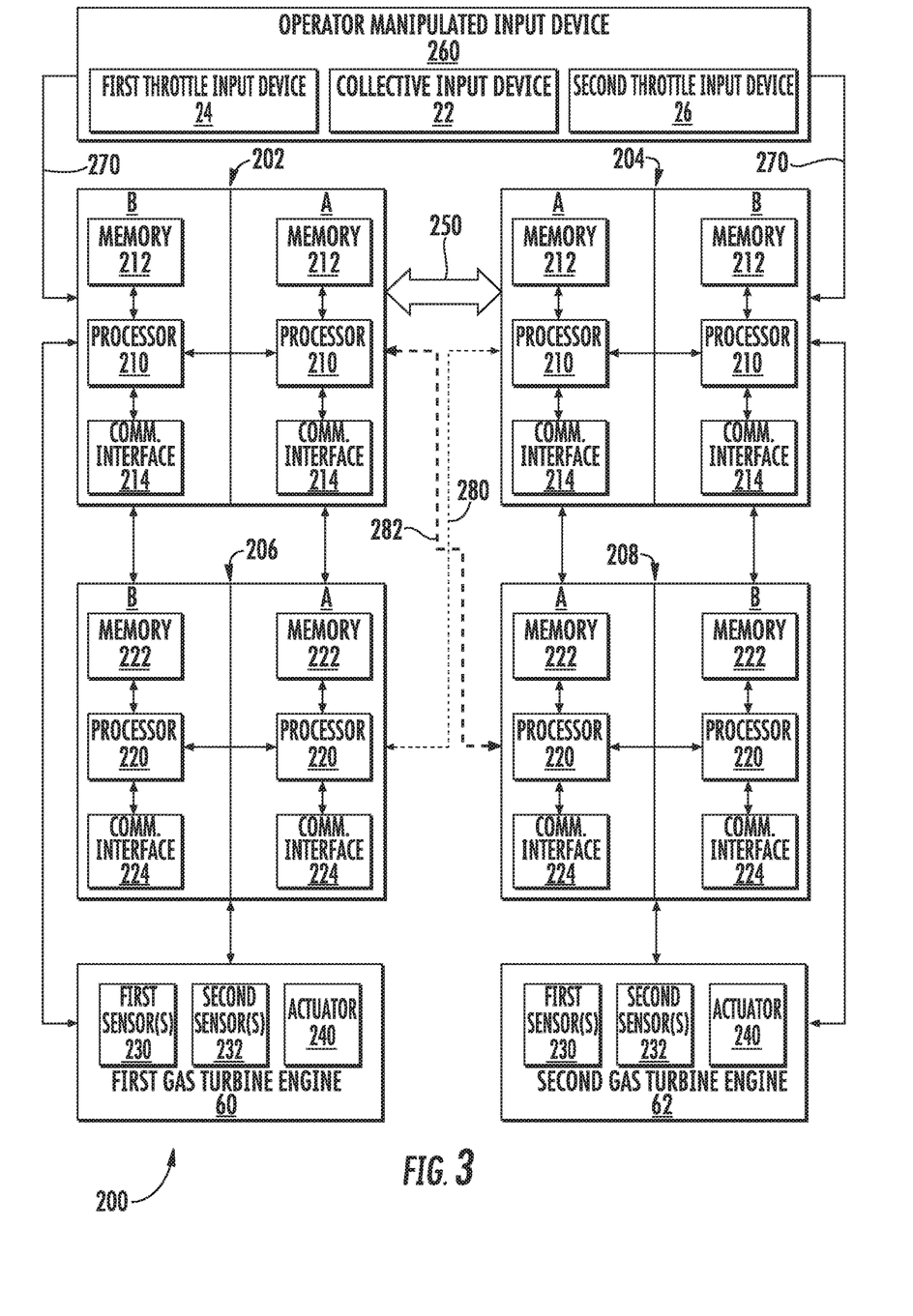
FIG. 3 illustrates a schematic view of a system for dynamically controlling the operation of an aircraft in accordance with one embodiment of the present disclosure.

Referring now to FIG. 3, one embodiment of a system 200 for dynamically controlling the operation of an aircraft is illustrated in accordance with aspects of the present subject matter. In general, the system 200 will be described with reference to the aircraft 10 and the gas turbine engine 100 described above with reference to FIGS. 1 and 2. However, in other embodiments, the system 200 may be implemented or used in association with any other suitable aircraft and/or any other suitable gas turbine engine.

As shown in FIG. 3, in one embodiment, the system 200 may include a first engine controller 202 and a second engine controller 204. During normal operation, the first engine controller 202 may control the operation of the first gas turbine engine 60, and the second engine controller 204 may control the operation of the second gas turbine 62. More specifically, in several embodiments, the first engine controller 202 may control operation of the first gas turbine engine 60 via a first fuel controller 206, and the second engine controller 204 may control operation of the second gas turbine 62 via a second fuel controller 208.

The first and second engine controllers 202, 204 may each generally include one or more processor(s) 210 and associated memory 212 configured to perform a variety of computer-implemented functions (e.g., performing the methods, steps, calculations and the like disclosed herein). Additionally, the first and second fuel controllers 206, 208 may each include one or more processor(s) 220 and associated memory 222 configured to perform a variety of computer-implemented functions. It should be appreciated, however, that the first and second fuel controllers 206, 208 may be programmable logic devices, such as a Field Programmable Gate Array (FPGA).

As used herein, the term "processor" refers not only to integrated circuits referred to in the art as being included in a computer, but also refers to a controller, microcontroller, a microcomputer, a programmable logic controller (PLC), an application specific integrated circuit (ASIC), a Field Programmable Gate Array (FPGA), and other programmable circuits. Additionally, the memory 212, 222 may generally include memory element(s) including, but not limited to, computer readable medium (e.g., random access memory (RAM)), computer readable non-volatile medium (e.g., flash memory), a compact disc-read only memory (CD-ROM), a magneto-optical disk (MOD), a digital versatile disc (DVD) and/or other suitable memory elements or combinations thereof.

The first and second engine controllers 202, 204 each may also include a communications interface module 214. The communications interface module 214 includes associated electronic circuitry that is used to send and receive data. More specifically, the communications interface module 214 of the first engine controller 202 is used to send and receive data to and from the first fuel controller 206. Likewise, the communications interface module 214 of the second engine controller 204 is used to send and receive data to and from the second fuel controller 208. It should be appreciated that the communications interface module 214 may be any combination of suitable wired or wireless communications interfaces.

The first engine controller 202 may also be in communication with one or more first sensor(s) 230 of the first gas turbine engine 60. Likewise, the second engine controller 204 may be in communication with one or more first sensors 230 of the second gas turbine engine 62. Examples of the one or more first sensor(s) 230 may include, without limitation, a pressure sensor, a temperature sensor, a torque sensor, and a speed sensor. As an example, the pressure sensor may be configured to sense an ambient pressure (P0) or an inlet pressure (P1) at the gas generator compressor 110, and the temperature sensor may be configured to sense an inlet temperature (T1) at the gas generator compressor 110. Alternatively, or in addition to, the pressure sensor may be configured to sense a discharge pressure ($P_{S3}$) at the outlet of the gas generator compressor 110, and the temperature sensor may be configured to sense a turbine gas temperature ($T_{4.5}$) within the turbine section 140. The torque sensor may be configured to detect an engine torque (Q1) of the first gas turbine engine 60. The speed sensor may be configured to detect a rotational speed $N_G$ of the gas generator shaft 160. Alternatively, or in addition to, the speed sensor may be configured to detect a rotational speed $N_P$ of the power turbine shaft 170. Accordingly, the one or more first sensor(s) 230 of the first gas turbine engine 60 may include any combination of the sensors (e.g., pressure, temperature, torque, speed) mentioned above.

It should be appreciated that the first engine controller 202 may be communicatively coupled to the one or more first sensor(s) 230 of the first gas turbine engine 60 via a wired connection. For example, the first engine controller 202 may receive data (e.g., analog or digital) from the one or more first sensor(s) 230 of the first gas turbine engine 60 via the wired connection. It should also be appreciated that the second engine controller 204 may be communicatively coupled to the one or more first sensor(s) of the second gas turbine engine 62 via a wired connection. As such, the second engine controller 204 may receive data (e.g., analog or digital) from the one or more first sensor(s) 230 of the second gas turbine engine 62 via the wired connection.

The first and second engine controllers 202, 204 may be communicatively coupled to one another via a data bus 250. Thus, the first and second engine controllers 202, 204 may exchange data via the data bus 250. For example, the first engine controller 202 may send data over the data bus 250 to the second engine controller 204. More specifically, the data may indicate one or more operating parameters of the first gas turbine engine 60. For instance, operating parameters of the first gas turbine engine 60 may include, without limitation, the engine torque ($Q_1$), turbine gas temperature ($T_{4.5}$), and compressor discharge pressure ($P_3$).

It should be appreciated that the first engine controller 202 may receive data from the second engine controller 204 over the data bus 250. For example, the data may indicate one or more operating parameters of the second gas turbine engine 62. Specifically, operating parameters of the second gas turbine engine 62 may include, without limitation, engine torque ($Q_1$), turbine gas temperature ($T_{4.5}$), and compressor discharge pressure ($P_3$). It should also be appreciated that the operating parameters of the first gas turbine engine 60 may be detected by the one or more first sensor(s) 230 of the first gas turbine engine 60. Specifically, the first engine controller 202 may receive the operating parameters directly from the one or more first sensor(s) 230. Further, the operating parameters of the second gas turbine 62 may be detected by the one or more first sensor(s) 230 of the second gas turbine engine 62. Thus, the second engine controller 204 may receive the operating parameters directly from the one or more first sensor(s) 230 of the second gas turbine engine 62.

The first and second fuel controllers 206, 208 may each include a communications interface module 224. The communications interface module 224 of the first and second fuel controllers 206, 208 includes associated electronic circuitry that is used to send and receive data. More specifically, the communications interface module 224 of the first fuel controller 206 is used to send and receive data to and from the first engine controller 202. Likewise, the communications interface module 224 of the second fuel controller 208 is used to send and receive data to and from the second engine controller 204. It should be appreciated that the communications interface module 224 may be any suitable wired or wireless communications interface.

The first fuel controller 206 may be in communication with one or more second sensor(s) 232 and/or actuator(s) 240 of the first gas turbine engine 60. Likewise, the second fuel controller 208 may be in communication with one or more second sensor(s) 232 and/or actuator(s) 240 of the second gas turbine engine 62. Examples of the one or more second sensor(s) 232 may include, without limitation, a speed sensor. As an example, the speed sensor may be configured to detect a rotational speed $N_G$ of the gas generator shaft 160. Alternatively, or in addition to, the speed sensor may be configured to detect a rotational speed $N_P$ of the power turbine shaft 170. Accordingly, the one or more second sensor(s) 232 may include any combination of the sensors (e.g., pressure, temperature, torque, speed) mentioned above.

It should be appreciated that the first fuel controller 206 may be communicatively coupled to the one or more second sensor(s) 232 of the first gas turbine engine 60 via a wired connection. For example, the first fuel controller 206 may receive data (e.g., analog or digital) from the one or more second sensor(s) 232 of the first gas turbine engine 60 via the wired connection. It should also be appreciated that the second fuel controller 208 may be communicatively coupled to the one or more second sensor(s) via a wired connection. For example, the second fuel controller 208 may receive data (e.g., analog or digital) from the one or more second sensor(s) 232 of the second gas turbine engine 62 via the wired connection.

As shown in FIG. 3, the first and second engine controllers 202, 204 may each be a dual-channel system with two redundant channels, a first channel A and a second redundant channel B. Likewise, the first and second fuel controllers 206, 208 may each be a dual-channel system having both the first channel A and the second redundant channel B. For both the engine and fuel controllers 202, 204, 206 and 208, channels A and B may provide redundancy in the engine control and operation. In particular, the first channel A and the second redundant channel B of the first and second engine controllers 202, 204 may each include the processor 210, the memory 212, and the communications interface module 214. Similarly, the first channel A and the second redundant channel B of the first and second fuel controllers 206, 208 may each include the processor 220, the memory 222, and the communication interface module 224.

The first and second engine controllers 202, 204 may be configured to receive one or more operator commands from an operator manipulated input device 260 of the aircraft 10. In particular, the first and second engine controllers 202, 204 may be communicatively coupled to the operator manipulated input device 260 via data buses 270. Thus, the first and second engine controllers 202, 204 may receive the one or more operator commands via data buses 270. It should be appreciated that the data buses 270 may be any suitable wired communications interface. For example, the data buses 270 may be based on ARINC 429, MIL-STD 1553, IEEE 1394, or any other suitable standard. It should also be appreciated, however, that the data buses 270 may, in other embodiments, be any suitable wireless communications interface.

In one embodiment, the operator manipulated input device 260 may be located in the cockpit 20 of the aircraft 10. For example, the operator manipulated input device 260 may include at least one of the collective input device 22, the first throttle input device 24, and the second throttle input device 26. As will be discussed below in more detail, the first and second engine controllers 202, 204 may be configured to control the operation of the aircraft 10 based, at least in part, on the one or more operator command(s) received over the data buses 270.

As an example, an operator of the aircraft 10 may generate an operator command through the collective input device 22. More specifically, the operator may manipulate the collective input device 22 to increase the lift of the aircraft 10. As such, the first engine controller 202 may be configured to control the first gas turbine engine 60 to increase the engine power of the first gas turbine engine 60 based, at least in part, on the operator command derived from the collective input device 22. As will be discussed below in more detail, the first engine controller 202 may increase the engine power of the first gas turbine engine 60 via one or more actuator(s) of the first gas turbine engine 60.

In one embodiment, the first engine controller 202 may be configured to increase engine power by modulating fuel flow to the first gas turbine engine 60. More specifically, the first engine controller 202 may transmit a command to the first fuel controller 206 in response to, at least in part, the received one or more operator commands. Further, the command may prompt the first fuel controller 206 to transmit a command to one or more actuator(s) 240 of the first gas turbine engine 60. Specifically, the actuator 240 may be a fuel metering valve (not shown), and the command may actuate the fuel metering valve to increase a fuel flow to a combustion section 130 of the first gas turbine engine 60.

Moreover, increasing the fuel flow to the first gas turbine engine 60 may increase the pressure and flow of the combustion gases 136, which may increase the power output of the power turbine shaft 170. As a result, the power transmitted by the output shaft 180 may increase, because the output shaft 180 is mechanically coupled to the power turbine shaft 170. Further, the power transmitted to the main rotor assembly 40 may increase, because the main rotor assembly 40 is mechanically coupled to the output shaft 180. Still further, increasing the power transmitted to the main rotor assembly 40 may generate the lift needed to move the aircraft 10 along the vertical direction V. Accordingly, the first engine controller 202 may be configured to control the operation of the aircraft 10 based, at least in part, on an operator command received from the collective input device 22.

It should be appreciated that the first engine controller 202 may be configured to increase or decrease engine power of the first gas turbine engine 60 in response to, at least in part, an operator command received from the first throttle input device 24. As an example, if an operator of the aircraft 10 moves the first throttle input device 24 to or towards the first position, the first engine controller 202 may increase engine power of the first gas turbine engine 60. In contrast, if the operator moves the first throttle input device 24 to or towards the second position, the first engine controller 202 may decrease engine power of the first gas turbine engine 60.

The first engine controller 202 may also be configured to adjust airflow within the first gas turbine engine 60. As an example, the first engine controller 202 may be configured to adjust airflow subsequent to an increase or decrease in the rotational speed $N_G$ of the gas generator shaft 160. In particular, the first engine controller 202 may transmit a command to the first fuel controller 206 in response to, at least in part, the increase or decrease to the rotational speed $N_G$ of the gas generator shaft 160. Further, the command may prompt the first fuel controller 206 to transmit a command to one or more actuator(s) 240 of the first gas turbine engine 60. Specifically, the one or more actuator(s) 240 may be a variable geometry actuator (not shown), and the command may actuate the variable geometry actuator to rotate the inlet guide vanes 112 and/or the variable vanes 116 towards or to a first position in which a maximum amount of air flows into the gas generator compressor 110. In contrast, the command may actuate the variable geometry actuator to rotate the inlet guide vanes 112 and/or the variable vanes 116 toward or to a second position in which a minimum amount of air flows into the gas generator compressor 110.

Moreover, increasing airflow through the gas generator compressor 110 may increase the power transmitted from the gas generator turbine 142 to the power turbine 144. As a result, a rotational speed $N_R$ of the output shaft 180 may increase, because the output shaft 180 is mechanically coupled to the power turbine shaft 170. Further, a rotational speed $N_R$ of the main rotor assembly 40 may increase, because the main rotor assembly 40 is mechanically coupled to the output shaft 180. Still further, increasing the power transmitted to the main rotor assembly 40 may generate the lift needed to move the aircraft 10 along the vertical direction V.

It should be appreciated that the second engine controller 204 may also receive the operator command(s) via the data buses 270, and may be configured to increase the engine power of the second gas turbine engine 62. More specifically, the second engine controller 204 may be configured to increase engine power of the second gas turbine engine 62 by modulating fuel flow to the second gas turbine 62 in substantially the same manner as discussed above with reference to the first engine controller 202 and first gas turbine engine 60. The second engine controller 204 may also be configured to adjust airflow of the second gas turbine engine 62 by rotating inlet guide vanes 112 and or variable vanes 116 of the second gas turbine engine 62 in substantially the same manner as discussed above with reference to the first engine controller 202 and the first gas turbine engine 60.

It should also be appreciated that the operator command may include two or more discrete operator commands generated through two or more of the operator manipulated input devices 260. For example, a first operator command may be received from the collective input device 22, and a second operator command may be received from the first throttle input device 24. Further, it should be appreciated, however, that the second engine controller 204 does not receive operator commands derived from the first throttle input device 24. Likewise, the first engine controller 202 does not receive operator commands derived from the second throttle input device 26.

Referring still to FIG. 3, in several embodiments, the first fuel controller 206 may be configured to detect a fault condition of the first engine controller 202 via any suitable method. In general, the first fuel controller 206 may be configured to detect the fault condition based on the lapse of a predetermined amount of time in which the first fuel controller 206 has not received communications from the first engine controller 202. More specifically, if channel B of the first fuel controller 206 does not receive a communication from channel B of the first engine controller 202 within the predetermined amount of time, then channel B of the first fuel controller 206 registers a fault condition for channel B of the first engine controller 202. In addition, channel B of the first fuel controller 206 communicates the fault condition to channel A of the first fuel controller 206.

Upon receiving the communication indicating the fault condition for channel B of the first engine controller 202, channel A of the first fuel controller 206 determines whether its most recent communication from channel A of the first engine controller 202 is within the predetermined amount of time. If the most recent communication occurred within the predetermined amount of time, then channel A of the first fuel controller 206 continues to control the operation of the first gas turbine engine 60. However, if the most recent communication did not occur within the predetermined amount of time, then channel A of the first fuel controller 206 registers a fault condition for channel A of the first engine controller 202.

When the first fuel controller 206 determines the fault condition exists for both channels A and B of the first engine controller 202, the first fuel controller 206 registers a fault condition indicating a complete failure of the first engine controller 202. It should be appreciated that the fault condition may occur for any number of reasons. For example, the first engine controller 202 may have been subjected to a ballistic event.

As shown in FIG. 3 and discussed below in more detail, the system 200 may also include a first data bus 280 that provides a communications interface between the first fuel controller 206 and the second engine controller 204. Likewise, the system 200 may include a second data bus 282 that provides a communications interface between the second fuel controller 208 and the first engine controller 202. In one embodiment, the first data bus 280 may correspond to a backup data bus that the second engine controller 204 uses to dynamically control the operation of the first gas turbine engine 60 when the fault condition is detected for the first engine controller 202. Similarly, in one embodiment, the second data bus 282 may correspond to a backup data bus that the first engine controller 202 uses to dynamically control the operation of the second gas turbine engine 62 when the fault condition is detected for the second engine controller 204. It should be appreciated that the first and second data buses 280, 282 may be any suitable wired or wireless communications interface.

Figure 4:
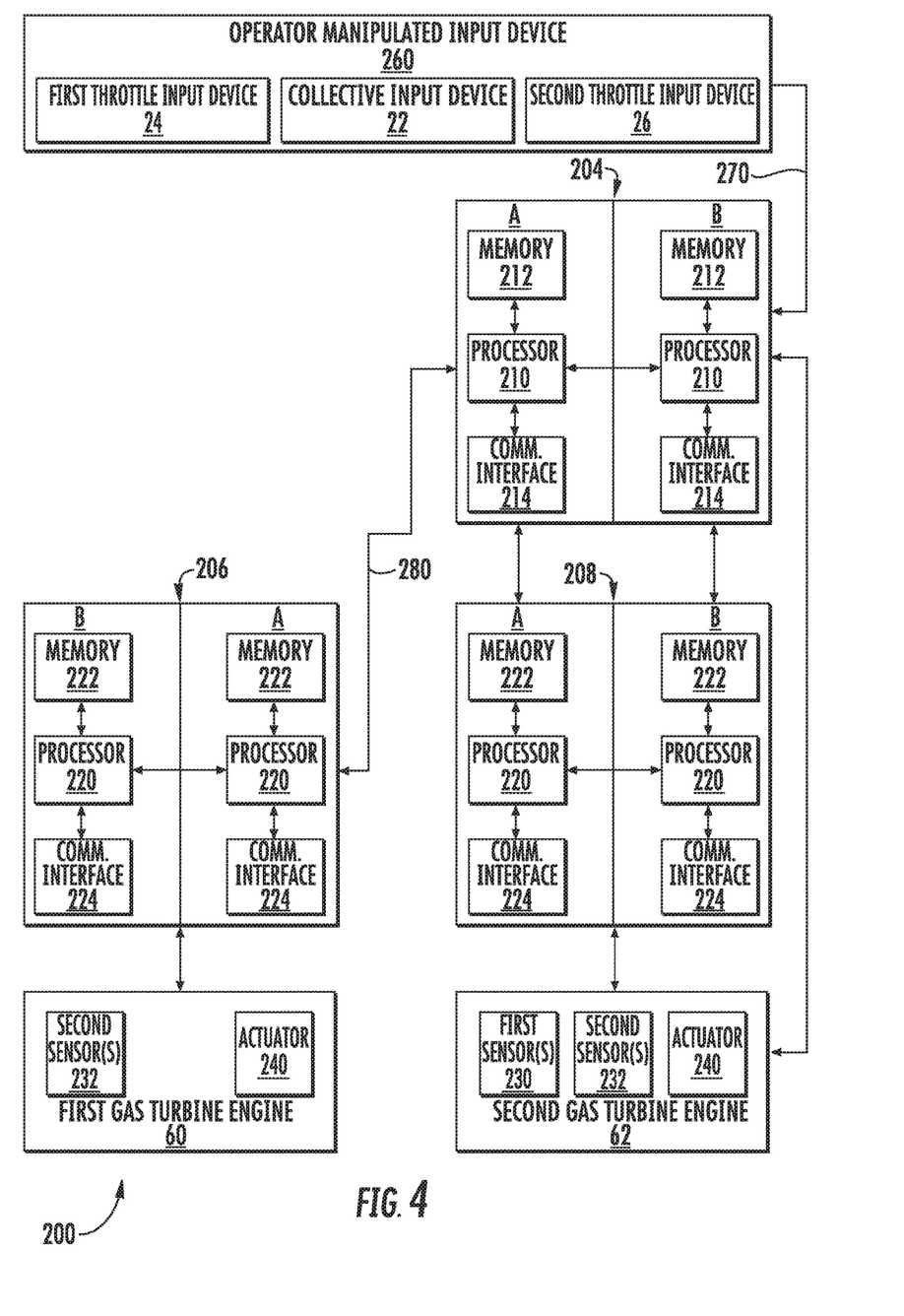
FIG. 4 illustrates another schematic view of the system in FIG. 3, particularly illustrating an instance in which an engine controller of one of the gas turbine engines of the aircraft is used to dynamically control both of the gas turbine engines.

Referring now to FIG. 4, the disclosed system 200 will now be described with reference to its operation when a fault condition is detected for the first engine controller 202, thereby indicating that the controller 202 is no longer functioning properly. As shown in FIG. 4, control of the first gas turbine engine 60 switches from the first engine controller 202 to the second engine controller 204 when the fault condition is detected. More specifically, the first fuel controller 206 may transmit a notification signal to the second engine controller 204 when the fault condition indicating a complete failure of the first engine controller 202 is detected. The notification signal may indicate the fault condition, and may prompt communications between the second engine controller 204 and the first fuel controller 206 via the first data bus 280. Accordingly, the second engine controller 204 may use the first data bus 280 to dynamically control the operation of the first gas turbine engine 60 via the first fuel controller 206.

Further, the second engine controller 204 may receive data from the one or more second sensor(s) 232 of the first gas turbine 60 via the first data bus 280. As an example, the second engine controller 204 may receive data from the first fuel controller 206 indicating the rotational speed $N_G$ of the gas generator shaft 160 and the rotational speed $N_P$ of the power turbine shaft 170. Still further, the second engine controller 206 may be in communication with one or more actuators 240 of the first gas turbine engine 60 via the first fuel controller 206 and the first data bus 280. For example, the second engine controller 204 may be in communication with an actuator 240 of the first gas turbine engine 60 to increase or decrease the engine power level of the first gas turbine 60 in response to, at least in part, the one or more new operator command(s) received subsequent to detecting the fault condition for the first engine controller 202. More specifically, the actuator 240 may be a fuel metering valve (not shown) configured to regulate an amount of fuel flowing into the combustion section 130 via the fuel nozzles 124.

Alternatively, or in addition to, the second engine controller 204 may be in communication with an actuator of the first gas turbine engine 60 to increase or decrease airflow within the first gas turbine engine 60. For example, the actuator 240 may be a variable geometry actuator (not shown) configured to rotate the inlet guide vanes 112 and/or variable vanes 116 of the first gas turbine engine 60 between a first position and a second position. Alternatively, the actuator 240 may be a bleed valve actuator (not shown). It should be appreciated that, in some embodiments, the actuator 240 may include any combination of the actuators discussed above. For example, in one embodiment, the actuator 240 may include the fuel metering valve, the variable geometry actuator, and the bleed valve actuator.

As already mentioned, the first and second engine controllers 202, 204 may exchange data indicating operating parameters of the first and second gas turbine engines 60, 62 via the data bus 250. It should be appreciated, however, that the data bus 250 may become inoperable when the fault condition is detected. As such, once the data bus 250 becomes inoperable, the second engine controller 204 can no longer receive information from the first engine controller 202 indicating operating parameters of the first gas turbine engine 60. In particular, the second engine controller 204 no longer receives data from the one or more first sensor(s) 230 of the first gas turbine engine 60. Thus, the second engine controller 204 can no longer receive data indicating certain operating parameters of the first gas turbine engine 60 such as, without limitation, engine torque (Q1), turbine gas temperature ($T_{4.5}$), and compressor discharge pressure ($P_3$).

However, the second engine controller 204 may be configured to control the first gas turbine engine 60 using data from the one or more second sensor(s) 232. In addition, the second engine controller 204 may include an application program stored in memory 212. Further, upon executing the application program, the second engine controller 204 may be configured to estimate parameters of the first gas turbine engine 60 that can no longer be measured due to the fault condition. More specifically, the second engine controller 204 may estimate parameters that were previously measured by the one or more first sensor(s) 230 and use those estimates to better control the first gas turbine engine 60. For example, the second engine controller 204 may estimate, among other things, the engine torque (Q1), the turbine gas temperature ($T_{4.5}$), and/or the compressor discharge pressure ($P_3$) of the first gas turbine engine 60.

The second engine controller 204 may be further configured to update an operating efficiency of the first gas turbine engine 60 and/or other parameters of the application program of the first gas turbine engine 204 based, at least in part, on the estimated parameters and/or information previously supplied by the first engine controller 202 prior to the fault detection. Thus, the application program may be an engine model that is specific to the condition of the first gas turbine engine 60.

Figure 5:
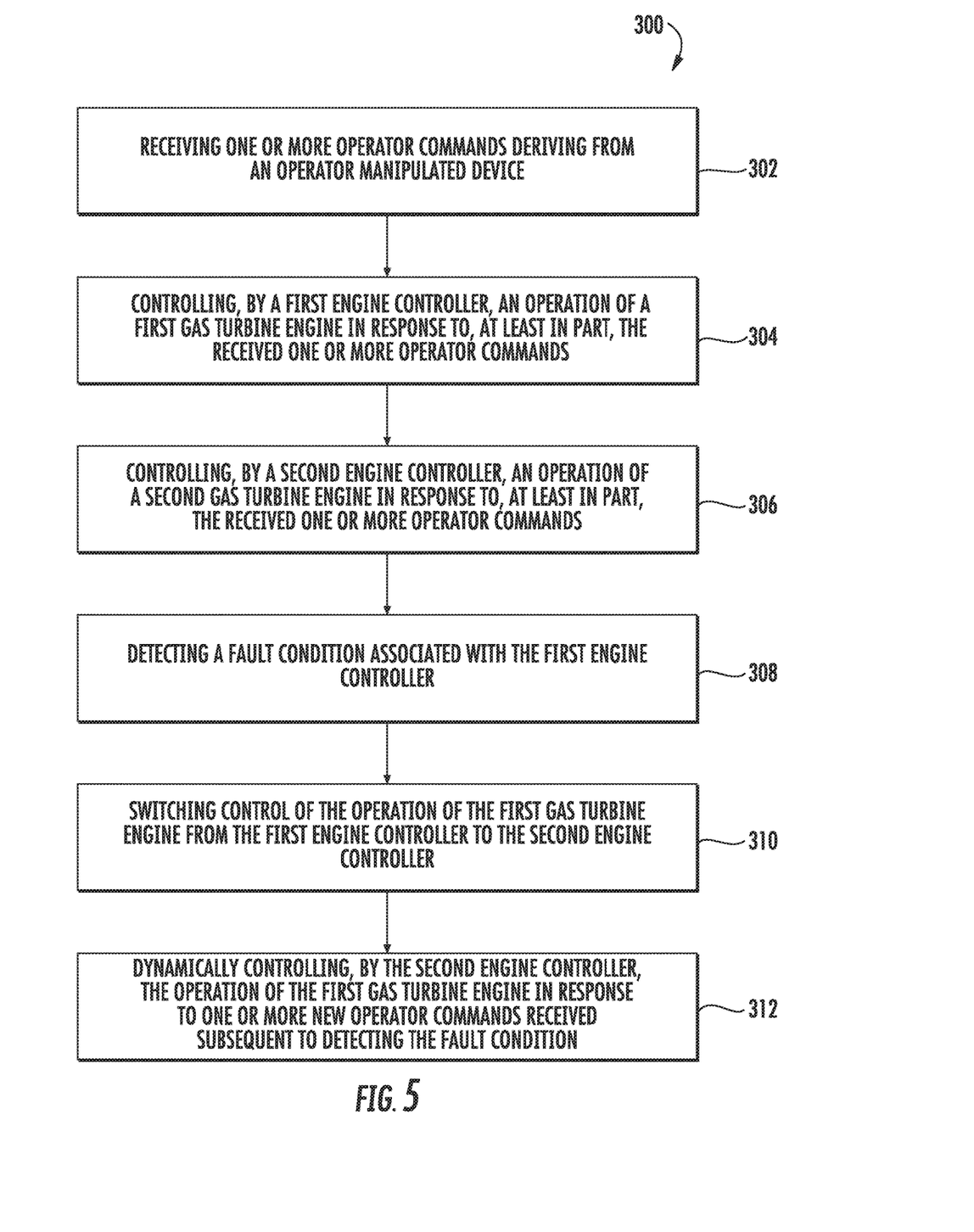
FIG. 5 illustrates a flow diagram of one embodiment of a method for dynamically controlling the operation of an aircraft in accordance with aspects of the present subject matter.

Referring now to FIG. 5 a flow diagram of one embodiment of a method 300 for dynamically controlling the operation of an aircraft is illustrated in accordance with aspects of the present subject matter. In general, the method 300 will be discussed herein with reference to the system 200 described above with reference to FIGS. 3 and 4. However, it should be appreciated by those of ordinary skill in the art that the disclosed method 300 may generally be implemented with gas turbine engines having any other suitable engine configuration and/or with systems having any other suitable system configuration. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 5, at (302), the method 300 may include receiving, by a first engine controller and a second engine controller, one or more operator commands deriving from an operator manipulated input device. Specifically, in one embodiment, the first and second engine controllers may each receive the one or more operator commands from an operator manipulated input device located in a cockpit of an aircraft.

Additionally, at (304), the method 300 may include controlling, by the first engine controller, an operation of a first gas turbine engine in response to, at least in part, the received operator command(s). Specifically, in one embodiment, the first engine controller may adjust a fuel flow to a combustion section of the first gas turbine engine to increase or decrease the engine power level. Alternatively, or in addition, the first engine controller may rotate inlet guide vanes and/or variable vanes of the first gas turbine engine between a first and second position to increase or decrease the engine power level.

Moreover, at (306), the method 300 may include controlling, by the second engine controller, an operation of a second gas turbine engine in response to, at least in part, the received operator command. Specifically, in one embodiment, the second engine controller may adjust a fuel flow to a combustion section of the second gas turbine engine to increase or decrease the engine power level. Alternatively, or in addition, the second engine controller may rotate inlet guide vanes and/or variable vanes of the second gas turbine engine between a first position and a closed position to increase or decrease the engine power level.

Further, at (308), the method 300 may include detecting a fault condition associated with the first engine controller. Specifically, in one embodiment, a first fuel controller may be communicatively coupled to the first engine controller. In such an embodiment, the first fuel controller may be configured to detect the fault condition based, at least in part, on a lapse of time without receiving a communication from the first engine controller.

In addition, at (310), the method 300 may include switching control of the operation of the first gas turbine engine from the first engine controller to the second engine controller in response to detecting the fault condition associated with the first engine controller. Specifically, in one embodiment, the first fuel controller switches from a communications interface module with the first engine controller to a communications interface coupled to the second engine controller. Moreover, at (312), the method 300 may include dynamically controlling, by the second engine controller, the operation of the first gas turbine engine in response to, at least in part, one or more operator new commands received subsequent to detecting the fault condition. Specifically, in one embodiment, the one or more new operator commands are derived from the operator manipulated device located in the cockpit of the aircraft. It should be appreciated that the second engine controller 204 may provide simultaneous dynamic control of the first and second gas turbine engines 60, 62.

This written description uses examples to disclose the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for dynamically controlling the operation of an aircraft having a first gas turbine engine and a second gas turbine engine, the method comprising:
   receiving, by a first engine controller and a second engine controller, one or more operator commands deriving from an operator manipulated input device;
   controlling, by the first engine controller, an operation of the first gas turbine engine in response to, at least in part, the received one or more operator commands;
   controlling, by the second engine controller, an operation of the second gas turbine engine in response to, at least in part, the received one or more operator commands;
   detecting a fault condition associated with the first engine controller;
   switching control of the operation of the first gas turbine engine from the first engine controller to the second engine controller in response to detecting the fault condition; and
   dynamically controlling, by the second engine controller, the operation of the first gas turbine engine in response to, at least in part, one or more new operator commands received subsequent to detecting the fault condition, the one or more new operator commands deriving from the operator manipulated input device;
   wherein dynamically controlling the operation of the first gas turbine engine includes adjusting, by the second engine controller, an engine power level of the first gas turbine engine in response to, at least in part, the one or more new operator commands received subsequent to detecting the fault condition.

2. The method of claim 1, wherein adjusting the engine power level of the first gas turbine engine includes modulating, by the second engine controller, a fuel flow to a combustion section of the first gas turbine engine in response to, at least in part, the one or more new operator commands received subsequent to detecting the fault condition.

3. The method of claim 2, further comprising adjusting, by the second engine controller, airflow within the first gas turbine engine.

4. The method of claim 3, wherein adjusting airflow includes rotating, by the second engine controller, inlet guide vanes or variable vanes of the first gas turbine engine in response to, at least in part, an increase or decrease in a rotational speed of a gas generator shaft of the first gas turbine engine.

5. The method of claim 1, wherein a separate controller is communicatively coupled to the first engine controller, the separate controller being configured to detect the fault condition associated with the first engine controller.

6. The method of claim 5, wherein switching control from the first engine controller to the second engine controller includes receiving, by the second engine controller, a notification from the separate controller indicating the fault condition associated with the first gas turbine engine.

7. The method of claim 1, further comprising executing, by the second engine controller, an application program containing an engine model of the first gas turbine engine.

8. The method of claim 7, further comprising receiving, by the second engine controller, data from the first engine controller prior to detecting the fault condition associated with the first engine controller.

9. The method of claim 8, further comprising updating, by the second engine controller, the engine model of the first gas turbine engine based, at least in part, on the data received from the first engine controller prior to detecting the fault condition.

10. A system for controlling the operation of an aircraft having a first gas turbine engine and a second gas turbine engine, the system comprising:
a first engine controller configured to control an operation of the first gas turbine engine in response to, at least in part, one or more operator commands received from an operator of the aircraft; and
a second engine controller configured to control an operation of the second gas turbine engine in response to, at least in part, the one or more operator commands received from the operator;
wherein, when a fault condition is detected for the first engine controller, the second engine controller is configured to dynamically control the operation of the first gas turbine engine in response to, at least in part, one or more new operator commands received from the operator subsequent to detecting the fault condition; and
wherein the second engine controller is configured to dynamically control the operation of the first gas turbine engine by adjusting an engine power level of the first gas turbine engine in response to, at least in part, the one or more new operator commands received subsequent to detecting the fault condition.

11. The system of claim 10, wherein the second engine controller is configured to adjust the engine power level of the first gas turbine engine by modulating a fuel flow to the first gas turbine engine in response to, at least in part, the one or more new operator commands received subsequent to detecting the fault condition.

12. The system of claim 11, wherein the second engine controller is further configured to adjust airflow within the first gas turbine engine by rotating inlet guide vanes or variable vanes of the first gas turbine engine.

13. The system of claim 10, further comprising a separate controller communicatively coupled to the first engine controller, the separate controller being configured to detect the fault condition associated with the first gas turbine engine.

14. The system of claim 13, wherein the separate controller is communicatively coupled to the second engine controller, and wherein the separate controller is configured to transmit a notification to the second engine controller indicating the detected fault condition.

15. The system of claim 10, further comprising an operator manipulated input device configured to be used by the operator to transmit the one or more operator commands and the one or more new operator commands.

16. The system of claim 15, wherein the operator manipulated input device comprises at least one of a collective pitch input device, a first throttle input device, and a second throttle input device.

* * * * *